(12) United States Patent
Zhang et al.

(10) Patent No.: US 12,705,978 B2
(45) Date of Patent: Aug. 11, 2026

(54) POSITIONING USING TRAFFIC CONTROL

(71) Applicant: QUALCOMM Incorporated, San Diego, CA (US)

(72) Inventors: Han Zhang, Beiging (CN); Ning Luo, Cupertino, CA (US); Yinghua Yang, San Jose, CA (US); Yuxiang Peng, Sunnyvale, CA (US); Bo Zheng, Sunnyvale, CA (US); Gengsheng Zhang, Cupertino, CA (US); Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1050 days.

(21) Appl. No.: 17/341,951

(22) Filed: Jun. 8, 2021

(65) Prior Publication Data

US 2022/0392337 A1 Dec. 8, 2022

(51) Int. Cl.

| | |
|---|---|
| ***G08G 1/09*** | (2006.01) |
| ***G01S 5/00*** | (2006.01) |
| ***G08G 1/005*** | (2006.01) |
| ***G08G 1/095*** | (2006.01) |
| ***G08G 1/0967*** | (2006.01) |
| ***H04W 4/40*** | (2018.01) |
| ***H04W 4/80*** | (2018.01) |

(52) U.S. Cl.
CPC ....... *G08G 1/091* (2013.01); *G08G 1/096766* (2013.01); *H04W 4/40* (2018.02); *H04W 4/80* (2018.02)

(58) Field of Classification Search
CPC ...................................................... G08G 1/091
See application file for complete search history.

(56) References Cited

U.S. PATENT DOCUMENTS

| | | | | |
|---|---|---|---|---|
| 9,934,685 B1 * | 4/2018 | Bernhardt | G08G 1/005 | |
| 2002/0036584 A1 * | 3/2002 | Jocoy | G08G 1/164 | 342/72 |
| 2004/0178928 A1 * | 9/2004 | Butzer | G08G 1/095 | 340/908 |
| 2006/0009909 A1 | 1/2006 | Smith | | |
| 2011/0304476 A1 * | 12/2011 | Johnson | G08G 1/087 | 340/906 |
| 2015/0310737 A1 * | 10/2015 | Simanowski | G08G 1/087 | 340/910 |

(Continued)

FOREIGN PATENT DOCUMENTS

| | | |
|---|---|---|
| CN | 102576491 A | 7/2012 |
| WO | 2016048704 A1 | 3/2016 |
| WO | 2018215833 A1 | 11/2018 |

OTHER PUBLICATIONS

International Search Report and Written Opinion—PCT/US2022/025017—ISA/EPO—Sep. 6, 2022.

*Primary Examiner* — Davetta W Goins
*Assistant Examiner* — Pameshanand Mahase
(74) *Attorney, Agent, or Firm* — Thien T. Nguyen

(57) ABSTRACT

A positioning method includes: obtaining traffic control information indicative of transmission of a traffic control indication granting permission for vehicle motion, or permission for pedestrian motion, or a combination thereof and determining, based on the traffic control information, position-related information including a location of a user equipment (UE), a heading of the UE, or a combination thereof.

18 Claims, 11 Drawing Sheets

(56) References Cited

U.S. PATENT DOCUMENTS

| | | | | |
|---|---|---|---|---|
| 2015/0312404 | A1* | 10/2015 | Abramson | H04W 8/02 455/418 |
| 2016/0155327 | A1* | 6/2016 | Schlienz | G08G 1/096791 340/907 |
| 2018/0150086 | A1 | 5/2018 | Nobukawa et al. | |
| 2021/0041521 | A1* | 2/2021 | Canedo Rodriguez | G01C 21/183 |

* cited by examiner

POSITIONING USING TRAFFIC CONTROL

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, an apparatus includes: an input including a receiver, or one or more sensors, or a combination thereof; a memory; and a processor communicatively coupled to the input and the memory and configured to: obtain, via the input, traffic control information indicative of transmission of a traffic control indication granting permission for vehicle motion, or permission for pedestrian motion, or a combination thereof; and determine, based on the traffic control information, position-related information including a location of a user equipment (UE), a heading of the UE, or a combination thereof.

Implementations of such an apparatus may include one or more of the following features. The processor is configured to determine the heading of the UE based on a motion indication indicating a change in motion of the UE at a first time that is within a threshold amount of time relative to a second time corresponding to receipt of the traffic control indication at the UE or transmission of the traffic control indication by a traffic control indication source. The processor is configured to determine the heading of the UE based on a characteristic of a plurality of audible tones including the traffic control indication. The characteristic of the plurality of audible tones is a frequency of each of the plurality of audible tones, or a duration of each of the plurality of audible tones, or a periodicity of the plurality of audible tones, or a combination thereof.

Also or alternatively, implementations of such an apparatus may include one or more of the following features. The processor is configured to determine the position-related information based on a first reception magnitude of a first tone received by the UE from a first source and a second reception magnitude of a second tone received by the UE from a second source, or the processor is configured to determine the position-related information based on a first reception time of the first tone at the UE relative to a second reception time of the second tone at the UE, or the processor is configured to determine the heading of the UE based on a first frequency of the first tone perceived by the UE and a second frequency of the second tone perceived by the UE, or any combination thereof. The processor is configured to determine a direction of a source of a sound relative to the UE, and the processor is configured to determine the position-related information based on the direction of the source of the sound relative to the UE and a location of the source of the sound. The processor is configured to determine the location of the UE based on a traffic control indication source location indicated in a near-field communication received by the UE. The position-related information is a first heading of the UE, the apparatus is the UE, the apparatus includes a plurality of sensors, the processor is communicatively coupled to the plurality of sensors and is configured to determine a second heading of the UE based on measurements from the plurality of sensors, and the processor is configured to calibrate one or more of the plurality of sensors based on a difference between the first heading of the UE and the second heading of the UE. The position-related information is the heading of the UE, and the processor is configured to determine the heading of the UE based on speech received by the UE and based on map information.

In an embodiment, a positioning method includes: obtaining traffic control information indicative of transmission of a traffic control indication granting permission for vehicle motion, or permission for pedestrian motion, or a combination thereof; and determining, based on the traffic control information, position-related information including a location of a user equipment (UE), a heading of the UE, or a combination thereof.

Implementations of such a method may include one or more of the following features. Determining the position-related information includes determining the heading of the UE based on a change in motion of the UE at a first time that is within a threshold amount of time relative to a second time corresponding to receipt of the traffic control indication at the UE or transmission of the traffic control indication by a traffic control indication source. Determining the position-related information includes determining the heading of the UE based on a characteristic of a plurality of audible tones including the traffic control indication. The characteristic of the plurality of audible tones is a frequency of each of the plurality of audible tones, or a duration of each of the plurality of audible tones, or a periodicity of the plurality of audible tones, or a combination thereof.

Also or alternatively, implementations of such a method may include one or more of the following features. Determining the position-related information includes determining the heading of the UE based on a first reception magnitude of a first tone received by the UE from a first source and a second reception magnitude of a second tone received by the UE from a second source, or determining the position-related information includes determining the heading of the UE based on a first reception time of the first tone at the UE relative to a second reception time of the second tone at the UE, or determining the position-related information includes determining the heading of the UE based on a first frequency of the first tone perceived by the UE and a second frequency of the second tone perceived by the UE, or any combination thereof. The positioning method includes determining a direction of a source of a sound relative to the UE, and determining the position-related information includes determining the position-related information based on the direction of the source of the sound relative to the UE and a location of the source of the sound. The positioning method includes determining the location of the UE based on a traffic control indication source location indicated in a near-field communication received by the UE. The position-related information is a first heading of the UE, the positioning method includes determining a second heading of the UE based on measurements from a plurality of sensors of the UE, and the positioning method includes calibrating one or more of the plurality of sensors based on a difference between the first heading of the UE and the second heading of the UE. Determining the position-related information includes determining the heading of the UE based on speech received by the UE and based on map information.

In an embodiment, a traffic control apparatus includes: a traffic control indicator configured to emit a traffic control indication indicative of permission for vehicle motion, or permission for pedestrian motion, or a combination thereof, the traffic control indication including at least one of a light signal or an audio signal; a memory; a transmitter; and a processor, communicatively coupled to the traffic control indicator, the memory, and the transmitter, and configured instruct the traffic control indicator to emit the traffic control indication and configured to transmit, via the transmitter, a message indicating a reference time associated with an initial time of emission of the traffic control indication.

Implementations of such an apparatus may include one or more of the following features. The processor is configured to transmit, via the transmitter as part of the message, one or more characteristics of the traffic control indication. The traffic control indication includes a plurality of audible tones, and the one or more characteristics of the traffic control indication includes a frequency of the plurality of audible tones, or a duration of each of the plurality of audible tones, or a periodicity of the plurality of audible tones, or any combination thereof.

Also or alternatively, implementations of such an apparatus may include one or more of the following features. The processor is configured instruct the traffic control indicator to emit the traffic control indication to include one or more characteristics of the traffic control indication. The processor is configured to transmit, via the transmitter, a near-field communication indicating a location of the traffic control apparatus.

In an embodiment, a traffic control method includes: emitting, from a traffic control apparatus, a traffic control indication indicative of permission for vehicle motion, or permission for pedestrian motion, or a combination thereof, the traffic control indication including at least one of a light signal or an audio signal; and transmitting, from the traffic control apparatus, a message indicating a reference time associated with an initial time of emission of the traffic control indication.

Implementations of such a method may include one or more of the following features. Transmitting the message includes transmitting one or more characteristics of the traffic control indication. The traffic control indication includes a plurality of audible tones, and the one or more characteristics of the traffic control indication includes a frequency of the plurality of audible tones, or a duration of each of the plurality of audible tones, or a periodicity of the plurality of audible tones, or any combination thereof.

Also or alternatively, implementations of such an apparatus may include one or more of the following features. Emitting the traffic control indication includes emitting the traffic control indication to indicate one or more characteristics of the traffic control indication. The traffic control method includes transmitting, from the traffic control apparatus, a near-field communication indicating a location of the traffic control apparatus.

DETAILED DESCRIPTION

Figure 1:
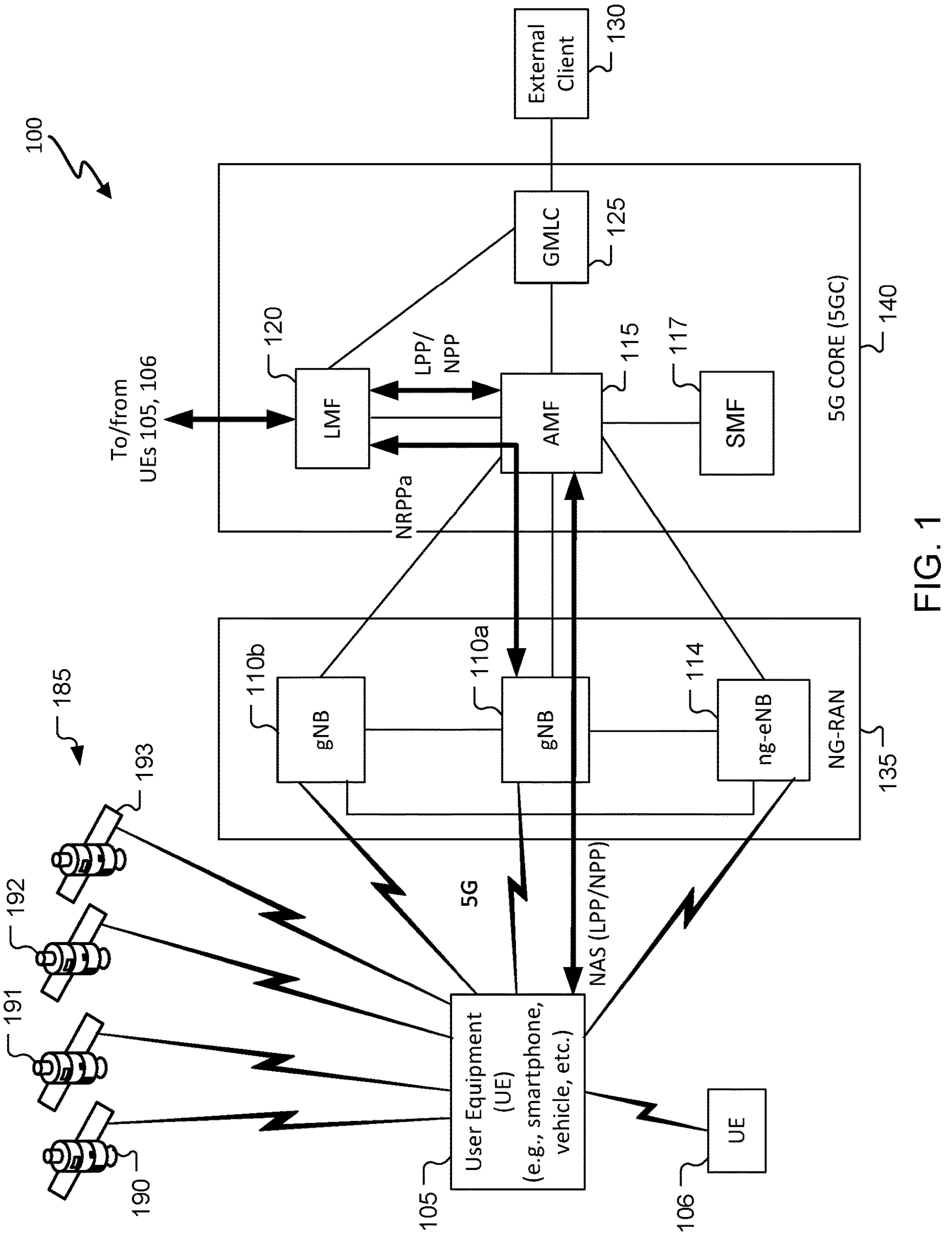
FIG. 1 is a simplified diagram of an example wireless communications system.

Techniques are discussed herein for determining position-related information, e.g., location of a device and/or heading (direction of motion) of the device. For example, indications of traffic control may be used to determine position-related information of a device such as a user equipment. The indications of traffic control may be used to determine the position-related information independently of other positioning information or in conjunction with other positioning information such as satellite signal measurements. Traffic control indications may, for example, be visual indications such as traffic lights and/or crosswalk lights, may be audible indications such as verbal commands or tones, and/or may be tactile indications such as vibrations of signs. The Other configurations, however, may be used. A heading of a device may be determined as direction of traffic in response to the device changing motion proximate in time to change in traffic flow permission (e.g., if the device moves shortly after a traffic light changes from red to green, then the heading of the device may be determined to coincide with the direction of travel permitted by the green light). The heading may also be determined based on change in device motion coinciding with a change in permission of pedestrian traffic, e.g., a crosswalk sign changing from "don't walk" to or tones being emitted from sources on either end of a crosswalk. Traffic control indicators may be used to determine position and/or heading of a device, e.g., by determining angle and direction from the device to a light source of a known location, and/or by determining distances from audio sources at respective ends of a crosswalk. A location of a mobile device may be determined based on receipt of a near-field communication (NFC) at the mobile device from a source of the NFC that is co-located with a pedestrian crossing request device at a known location. Position-related information determined based on one or more traffic-control indicators may be used to calibrate one or more sensors of a mobile device, e.g., a magnetometer and/or a gyroscope of the mobile device. These are examples, and other examples may be implemented.

Items and/or techniques described herein may provide one or more of the following capabilities, as well as other capabilities not mentioned. Positioning accuracy (e.g., location and/or heading) for a mobile device may be improved, especially in urban canyon environments. Mobile device sensors used to determine position information for the mobile device may be calibrated based on heading information determined based on traffic-control indicators. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA)

for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
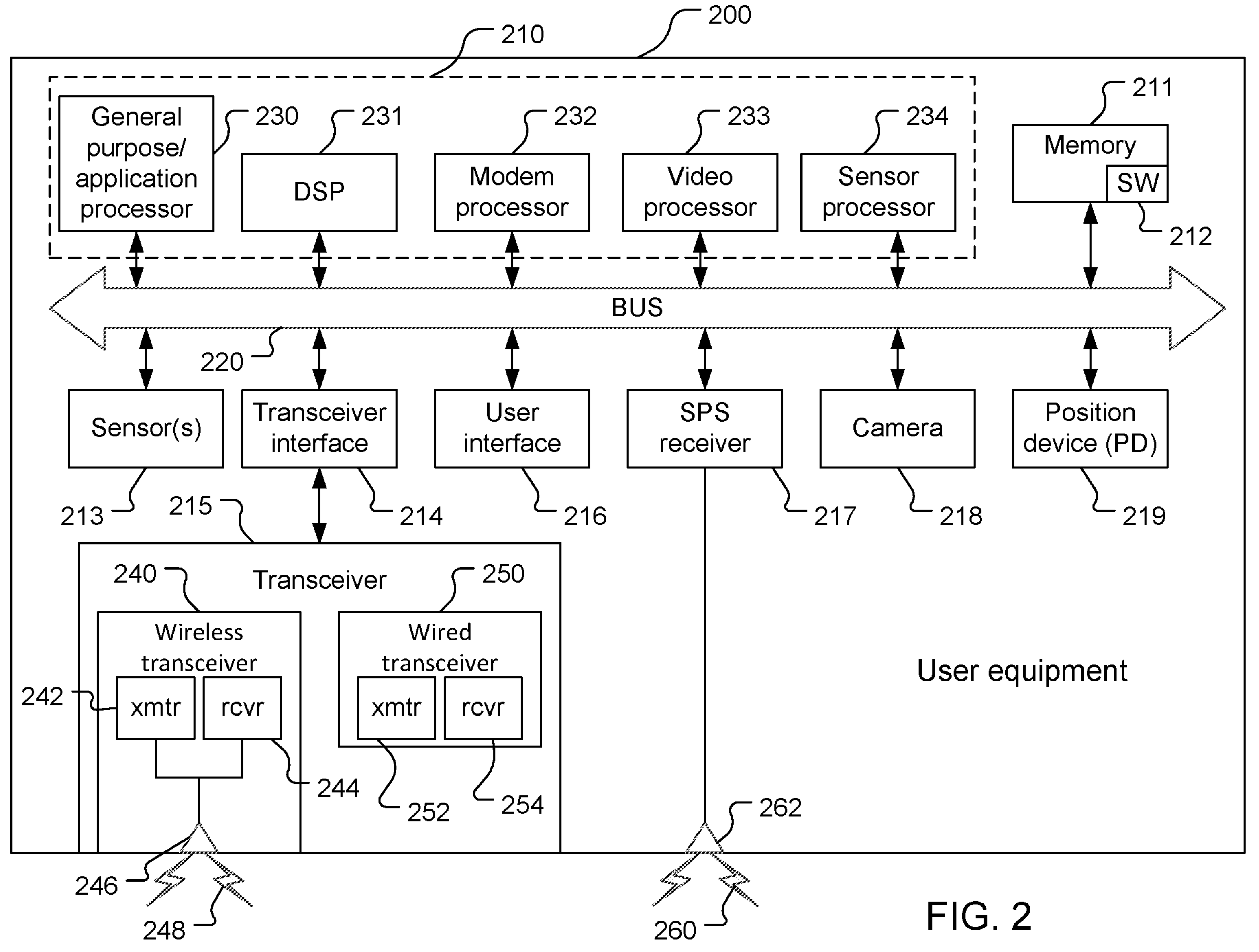
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identity, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
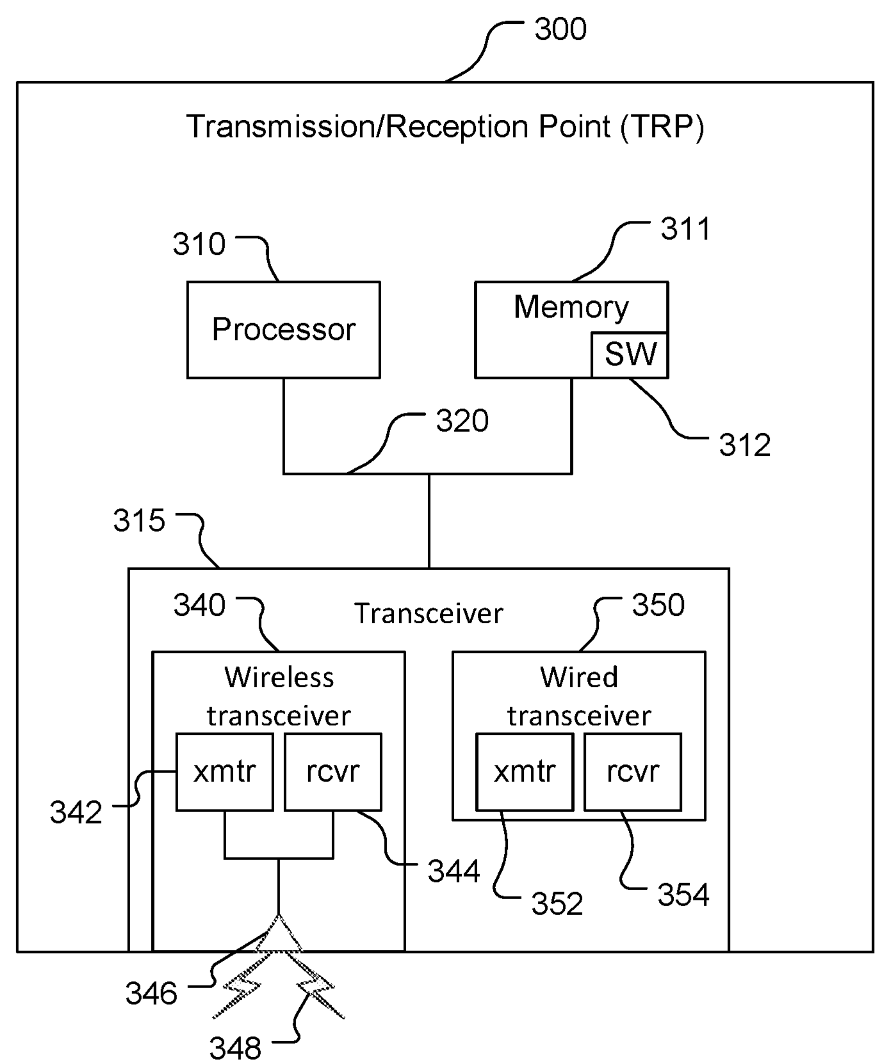
FIG. 3 is a block diagram of components of an example transmission/reception point.

Referring also to FIG. 3, an example of a TRP 300 of the BSs 110*a*, 110*b*, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
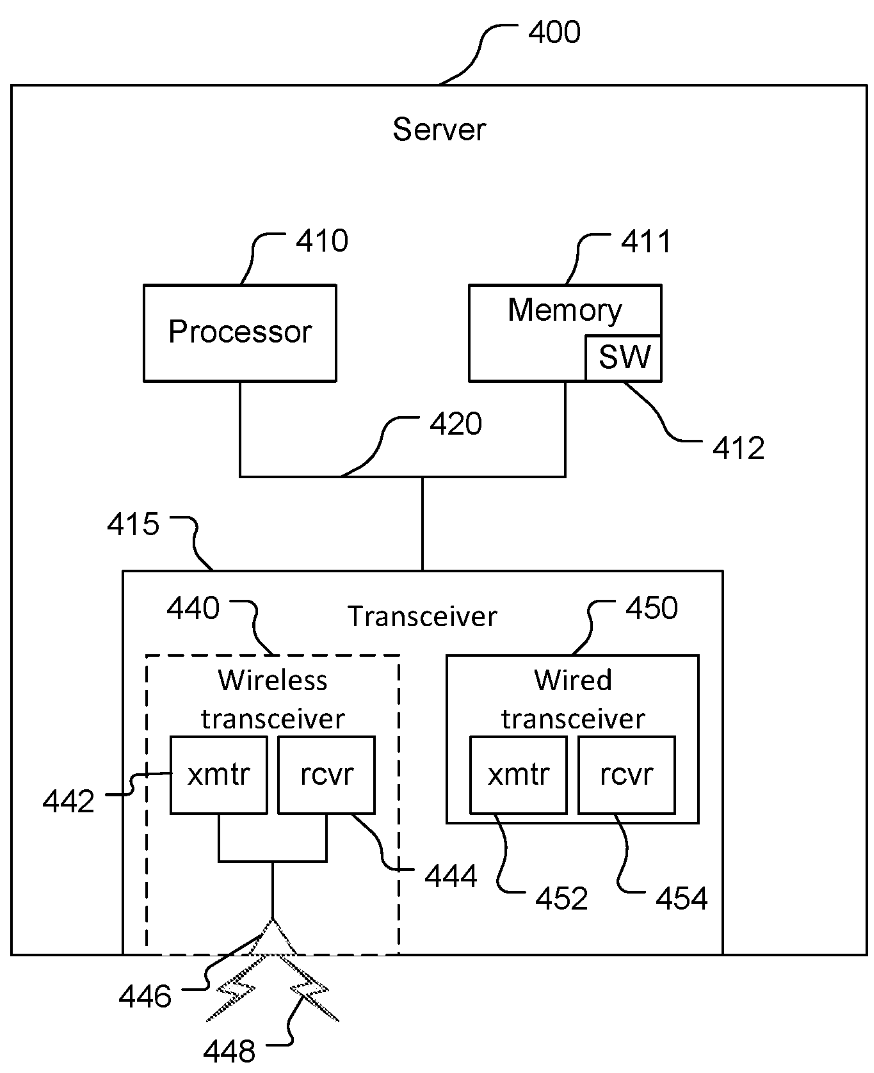
FIG. 4 is a block diagram of components of an example server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Traffic Control Indicators

Figure 5:
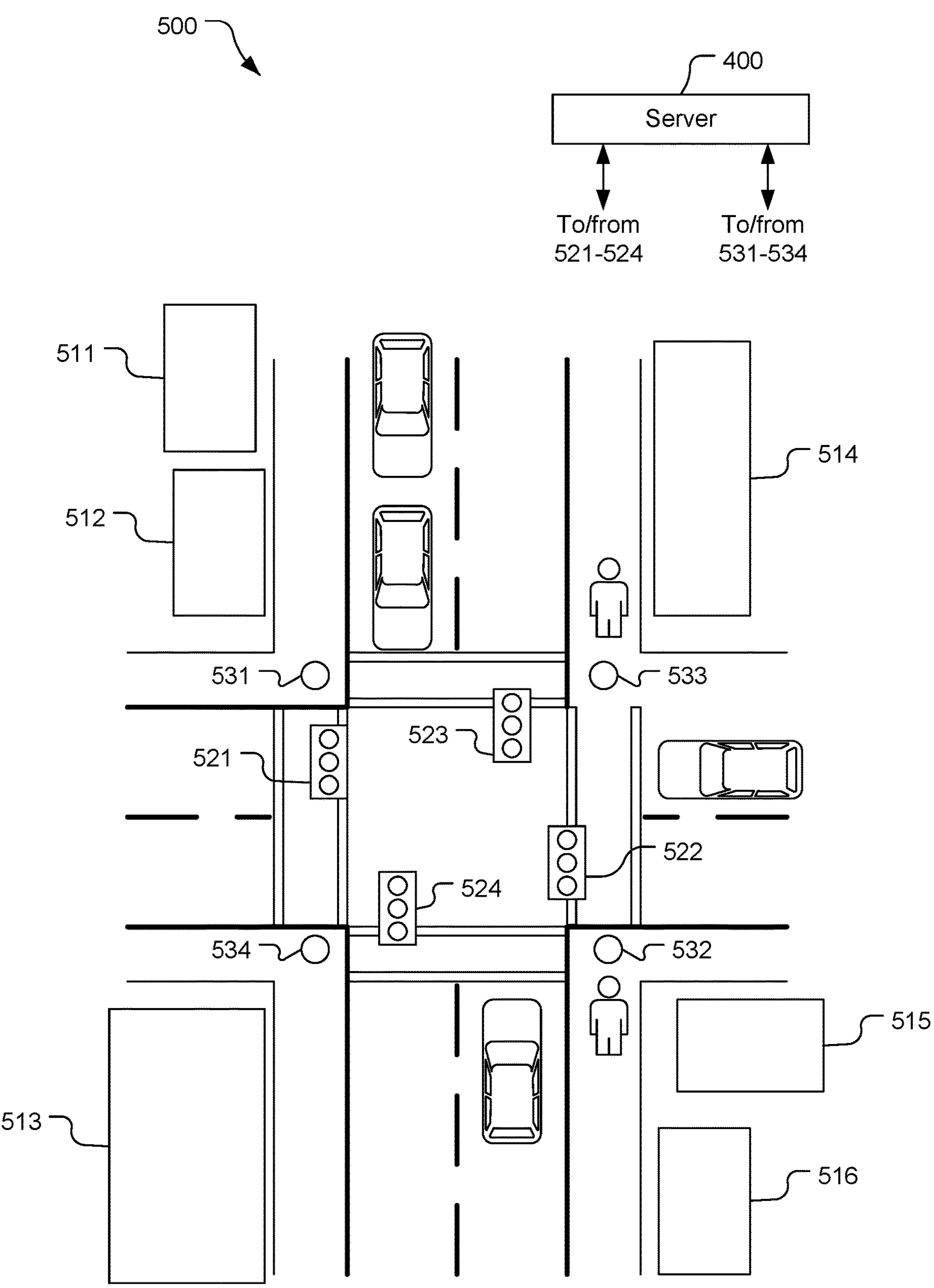
FIG. 5 is a simplified diagram of an urban canyon environment.

Referring to FIG. 5, positioning determination, i.e., determining a position of an entity (e.g., a UE) such as one or more positions over time (e.g., motion) of the entity, may be difficult in an environment 500 (e.g., an urban canyon) conducive to multipath reception of positioning signals (e.g., satellite signals, PRS from terrestrial-based TRPs, etc.). For example, positioning signals may reflect off one or more structures 511, 512, 513, 514, 515, 516 such that signals received by a mobile device in the environment 500 may not travel a direct path from a signal source to the mobile device, causing inaccurate range estimates and thus inaccurate heading and/or position estimates for the mobile device. Supplementing a positioning determination with sensor measurements may improve positioning accuracy. Due to potential sensor inaccuracy (e.g., gyroscope drift (often dependent on temperature), magnetic anomalies affecting magnetometer measurements, under-sampling of measurements relative to UE motion, etc.), further accuracy improvements may be desirable. The positioning determination may determine a position estimate for the UE and/or a direction of motion of the UE, e.g., based on position over time, e.g., for use in navigation. Positioning information such as a position estimate and/or a direction of motion may be unreliable and/or of poor accuracy in environments such as the environment 500. Device heading may be estimated from GNSS and sensor measurements input into a heading filter (e.g., a heading algorithm) such as a particle filter or a Kalman filter that uses previously-determined heading and present sensor measurements to produce a heading estimate. Both sensor and GNSS measurements may be inaccurate in deep urban environments, thus reducing the heading estimate accuracy. Heading estimate accuracy may also be affected by changes in orientation of the device relative to the heading.

A mobile device may be configured to use information available in urban canyons to improve positioning accuracy, e.g., to counteract positioning accuracy degradation due to inducement of multipath reception of positioning signals in the urban canyons. For example, pedestrian and/or vehicle traffic control indicators (e.g., from traffic lights 521, 522, 523, 524 and/or from crosswalk signalers 531, 532, 533, 534 and/or from other indicators) may be used to determine position and/or heading of a mobile device. The traffic control indicators may be used in conjunction with other information, e.g., map information for a region containing the mobile device and/or one or more sensor measurements made by the mobile device, to determine position-related information (e.g., location and/or heading) of the mobile device. The traffic lights 521-524 and the crosswalk signalers 531-534 are communicatively coupled to the server 400, e.g., to receive instructions from the server 400 to transmit traffic control indicators and/or to inform the server 400 of transmitted traffic control indicators (e.g., one or more characteristics of the indicators, e.g., timing of transmission, frequency of transmitted tone(s), tone duration(s), tone periodicity(ies) (i.e., time between beginnings of consecutive tones), etc.).

Figure 6:
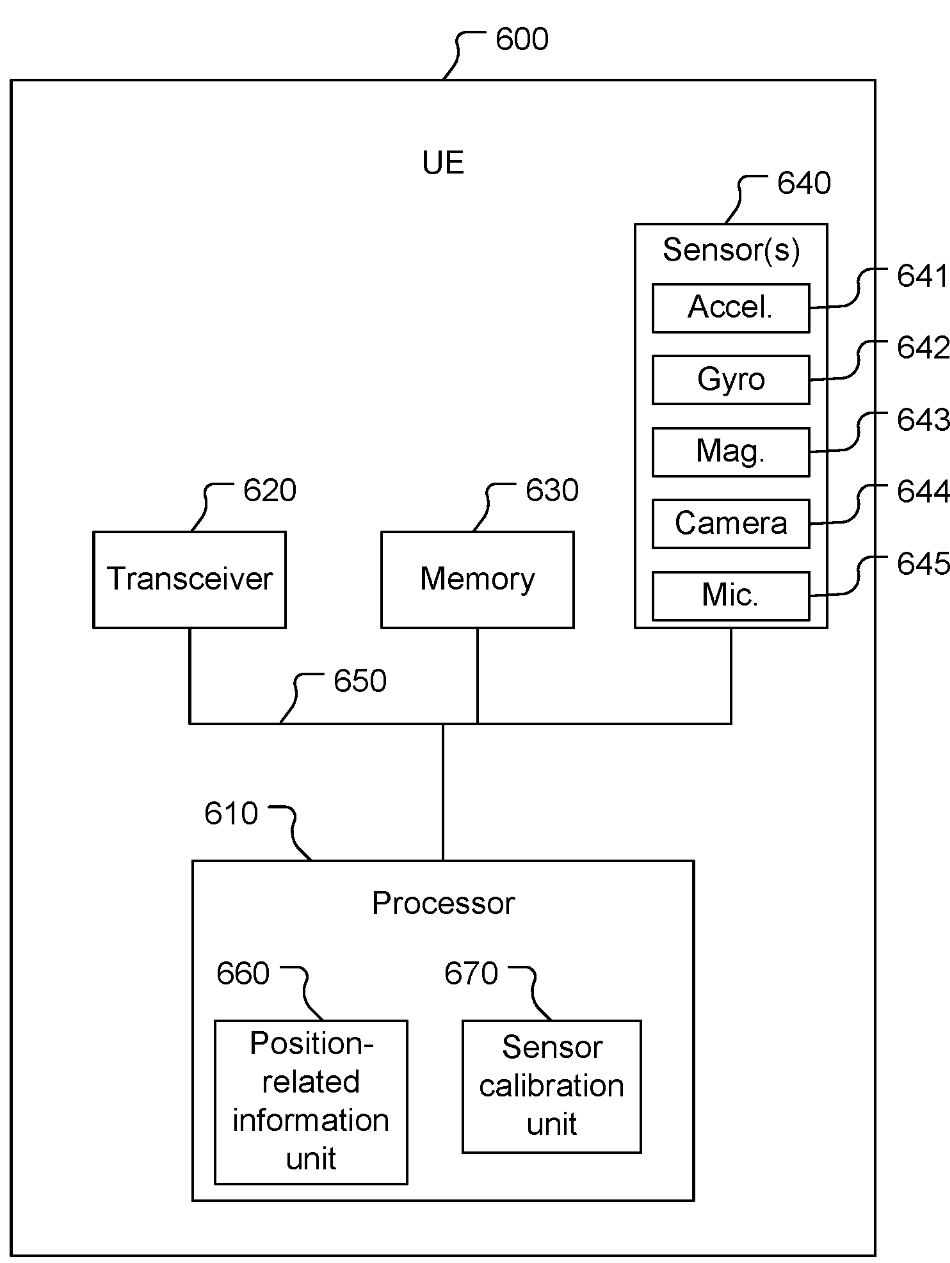
FIG. 6 is a simplified block diagram of an example user equipment.

Referring to FIG. 6, with further reference to FIGS. 1-5, a UE 600 includes a processor 610, a transceiver 620, a memory 630, and one or more sensors 640 communicatively coupled to each other by a bus 650. The UE 600 may include the components shown in FIG. 6, and may include one or more other components such as any of those shown in FIG. 2 such that the UE 200 may be an example of the UE 600. The processor 610 may include one or more components of the processor 210. The transceiver 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 620 may include the wired transmitter 252 and/or the wired receiver 254. The transceiver 620 may include the SPS receiver 217 and the antenna 262. The memory 630 may be configured similarly to the memory 211, e.g., including software with processor-readable instructions configured to cause the processor 610 to perform functions. The sensor(s) 640 may include one or more of the sensor(s) 213 such as an accelerometer 641 (e.g., a three-dimensional accelerometer), a gyroscope 642 (e.g., a three-dimensional gyroscope), a magnetometer 643 (e.g., a three-dimensional magnetometer), a camera 644 (e.g., the camera 218), and/or a microphone 645. One or more of the sensors 640 may comprise a micro electro-mechanical system (MEMS). Although referred to in the singular, the accelerometer 641 may include more than one accelerometer, the gyroscope 642 may include more than one gyroscope, the magnetometer 643 may include more than one magnetometer, the camera 644 may include more than one camera, and the microphone 645 may include more than one microphone.

The description herein may refer only to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the transceiver 620) may include a position-related information unit 660 and may include a sensor calibration unit 670. The position-related information unit 660, and the sensor calibration unit 670 are discussed further below, and the description may refer to the processor 610 generally, or the UE 600 generally, as performing any of the functions of the position-related information unit 660 and/or the sensor calibration unit 670.

Figure 7:
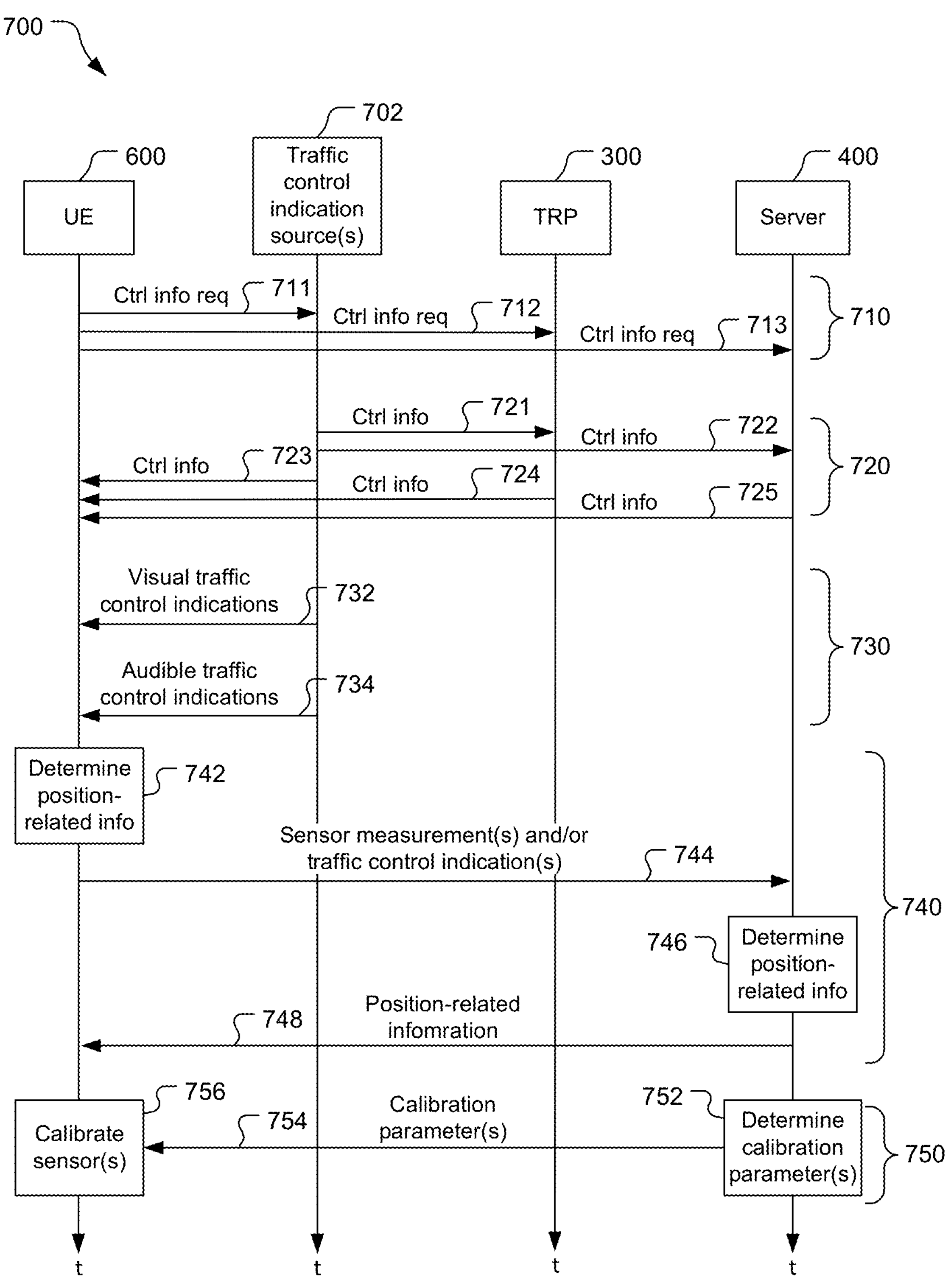
FIG. 7 is a signaling and process flow diagram for determining position-related information.

Referring to FIG. 7, with further reference to FIGS. 1-6, a signaling and process flow 700 for determining position-related information includes the stages shown. The flow 700 is an example, as stages may be added, rearranged, and/or removed. As shown in FIG. 7, signals may be exchanged between the UE 600, the TRP 300, and the server 400, and traffic control indications may be provided by one or more traffic control indication sources 702. The UE 600 may take a variety of forms, such as a vehicle or a portable device such as a smartphone or tablet that may be carried by a pedestrian. Other forms of UEs may be used.

At stage 710, the UE 600 requests traffic control information. For example, the UE 600 (e.g., the position-related information unit 660) may send one or more control information requests 711 to the traffic control indication source(s) 702, a control information request 712 to the TRP 300, and/or a control information request 713 to the server 400. The UE 600 may send one or more of the requests 711-713 in response to one or more of a variety of factors. For example, the UE 600 may send one or more of the requests 711-713 in response to position accuracy of the UE 600 being below a threshold accuracy, and/or in response to determining that the UE 600 is in an urban canyon (e.g., based on the UE 600 receiving multipath satellite signals and/or multipath PRS), and/or in response to determining proximity of the UE 600 to one or more of the source(s) 702, and/or one or more other factors. The request(s) 711 may be sent directly to the source(s) 702 if the source(s) 702 are configured for communication with the UE 600 (e.g., if the source(s) 702 are integrated with one or more respective TRPs). The requests 711-713 may request information such as the location(s) of the source(s) 702, timing of traffic control indications of traffic movement permissions, headings corresponding to the traffic movement permissions, etc. The traffic movement permissions may be for vehicle (e.g., car, motorcycle, bicycle, etc.) and/or pedestrian movement. Examples of traffic control indications of traffic movement permissions are indications of green traffic lights granting vehicle movement permission, indications of red traffic lights denying vehicle movement permission, a "walk" sign granting pedestrian movement permission, a "don't walk" sign denying pedestrian movement permission, repeated tones granting pedestrian movement permission and indicating a location of a street corner, and flickering lights in a crosswalk granting pedestrian movement permission. Still other examples of traffic control indications of traffic movement permissions may be used, whether presently existing or developed in the future. One or more of the requests 711-713 may be omitted from the flow 700. Indeed, stage 710 may be omitted from the flow 700.

At stage 720, the UE 600 receives control information. The source(s) 702, the TRP 300, and/or the server 400 may send one or more respective messages with control information 723, 724, 725, respectively. The control information 723, 724, 725 may include the location(s) of the source(s) 702. The control information 723, 724, 725 may indicate when a traffic movement permission has been changed by one or more of the sources 702. For example, the control information 723, 724, 725 may indicate that a permission for traffic (e.g., vehicle and/or pedestrian traffic) movement has changed from disallowed to allowed (e.g., a red light changed to a green light, or a "don't walk" sign" changed to a "walk" sign) or vice versa. Such traffic control indications may be transmitted wirelessly to the UE 600 and received, e.g., by the transceiver 620 (e.g., the wireless receiver 244 and the antenna 246). Indications of changes in traffic movement permission may be sent by the source(s) 702 to the TRP 300 and/or the server 400 in respective messages of control information 721, 722 for transmission of corresponding indications to the UE 600 and/or for other use, e.g., by the server 400 to determine heading and/or location of the UE 600.

Figure 8:
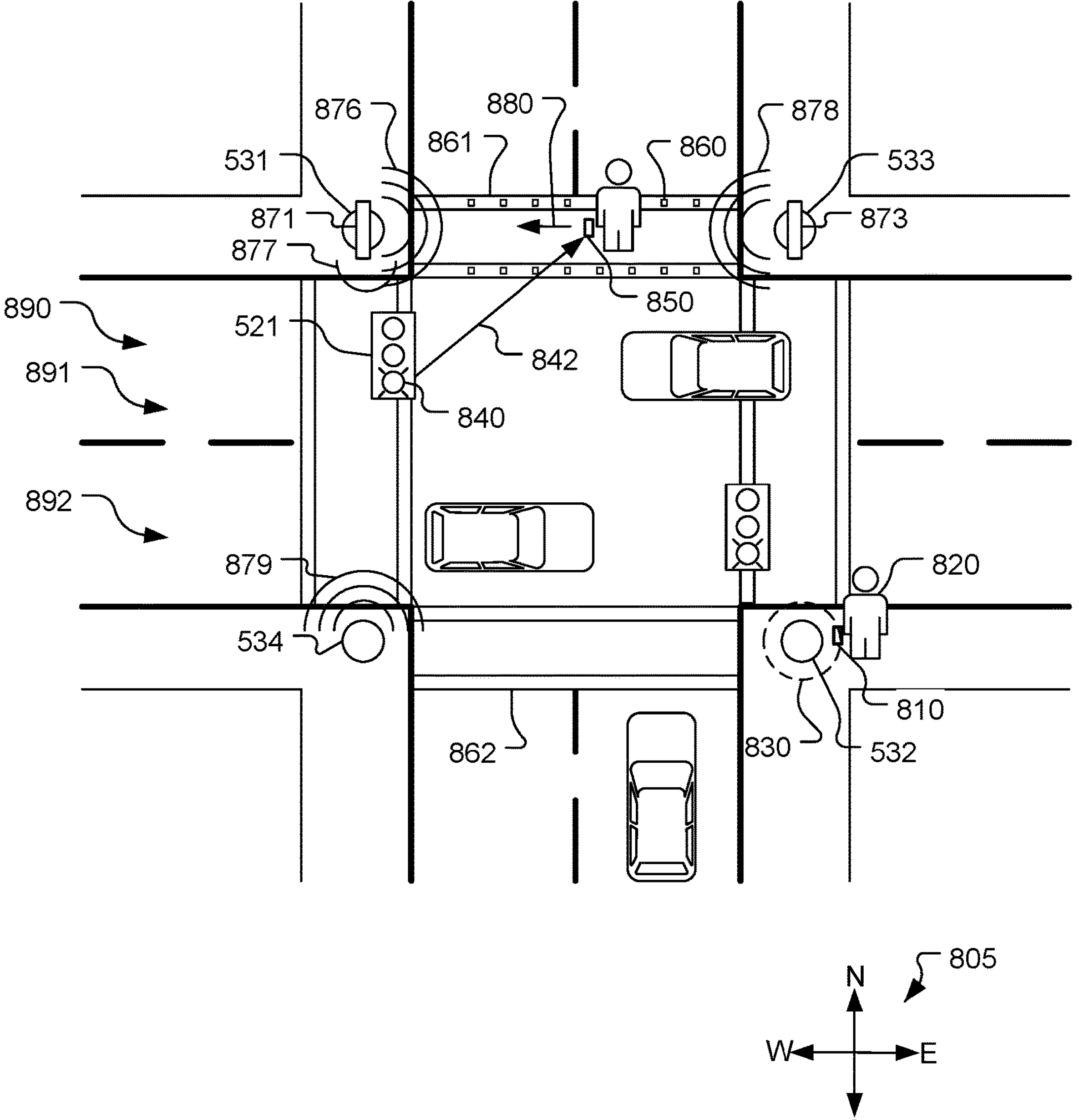
FIG. 8 is a more detailed, though simplified, portion of the environment shown in FIG. 5.

Referring also to FIG. 8, the control information 724 from the TRP 300 may comprise a near-field communication (NFC), with the TRP 300 co-located with the crosswalk signaler 531, for example in a traffic light pole. The control information 724, at least the NFC, may be broadcast or unicast, e.g., to a UE 810 associated with a pedestrian 820. The NFC has a short range 830 in which the NFC may be received by the UE 810 and information from the NFC extracted. The NFC may be transmitted periodically by the crosswalk signaler 532 to help ensure that any UE that comes within the range 830 of the crosswalk signaler 532 receives the NFC. The frequency of transmission of the NFC may be about 1 Hz or even less because pedestrians often stand near crosswalk signalers for several seconds waiting for permission to cross a crosswalk. The NFC may include a location of the crosswalk signaler 532, e.g., a pole. Because the location of the crosswalk signaler 532 may be known precisely (and does not change), and because the range 830 of the NFC is short, e.g., less than 2 m (e.g., about 1 m), the location of the crosswalk signaler 532 may be used as the location of the UE 810 based on the UE 810 successfully receiving and extracting information from the NFC. The location of the UE 810 may thus be determined with high accuracy, e.g., within 2 m, very reliably (because the crosswalk signaler 532 is stationary and the range of the NFC is known). In this example, the NFC is emitted by a crosswalk signaler, but an NFC may be emitted from another source, e.g., a control box for a traffic light. The source of the NFC may be located where pedestrians are likely to wait for permission to cross a crosswalk.

Stage 720 may be omitted from the flow 700. For example, position information (e.g., heading) of the UE 600 may be determined from traffic control indications from the traffic control indication sources 702 without knowing the location(s) of the source(s) 702 and without receiving an NFC from a crosswalk signaler.

At stage 730, one or more visual traffic control indications 732 and/or one or more audible traffic control indications 734 are transmitted by one or more of the traffic control indication source(s) 702, respectively. For example, as shown in FIG. 8, a green light 840 of the traffic light 521 emits green light 842 that is received by a UE 850, which is an example of the UE 600. The green light 842 may thus be received by the camera 218 of the UE 850. As another example, crosswalk lights 860 may emit light that may be received by the UE 850, e.g., the camera 218 of the UE 850. The crosswalk lights 860 may be disposed on borders of a crosswalk 861 as shown and/or disposed at other locations. Lights may be disposed in other crosswalks as well, but are not shown in FIG. 8 to help reduce complexity of the figure. As another example, light in the form of a "walk" indication (e.g., the word "walk", a symbol of a person walking, etc.) may be emitted by a walk/don't-walk sign 871 of the crosswalk signaler 531 and a walk/don't-walk sign 873 of the crosswalk signaler 533. One walk/don't-walk sign is shown for each of the crosswalk signalers 531, 533, but the crosswalk signalers 531, 533 may each have more than one walk/don't-walk sign. Further, although not shown in FIG. 8, other crosswalk signalers may include walk/don't-walk signs. As another example, the crosswalk signalers 531, 533 emit respective sound signals 876, 878. The sound signals 876, 878 may be, for example, accessible pedestrian signals (APS) that may be repeated, short tones (e.g., cuckoo sounds, chirp sounds), and/or verbal announcements (e.g., "walk", "wait", or a street name that is permitted to be crossed). The visual traffic control indications 732 and/or the audible traffic control indications 734 may be referred to in the plural, but this includes the singular where appropriate.

Figure 9:
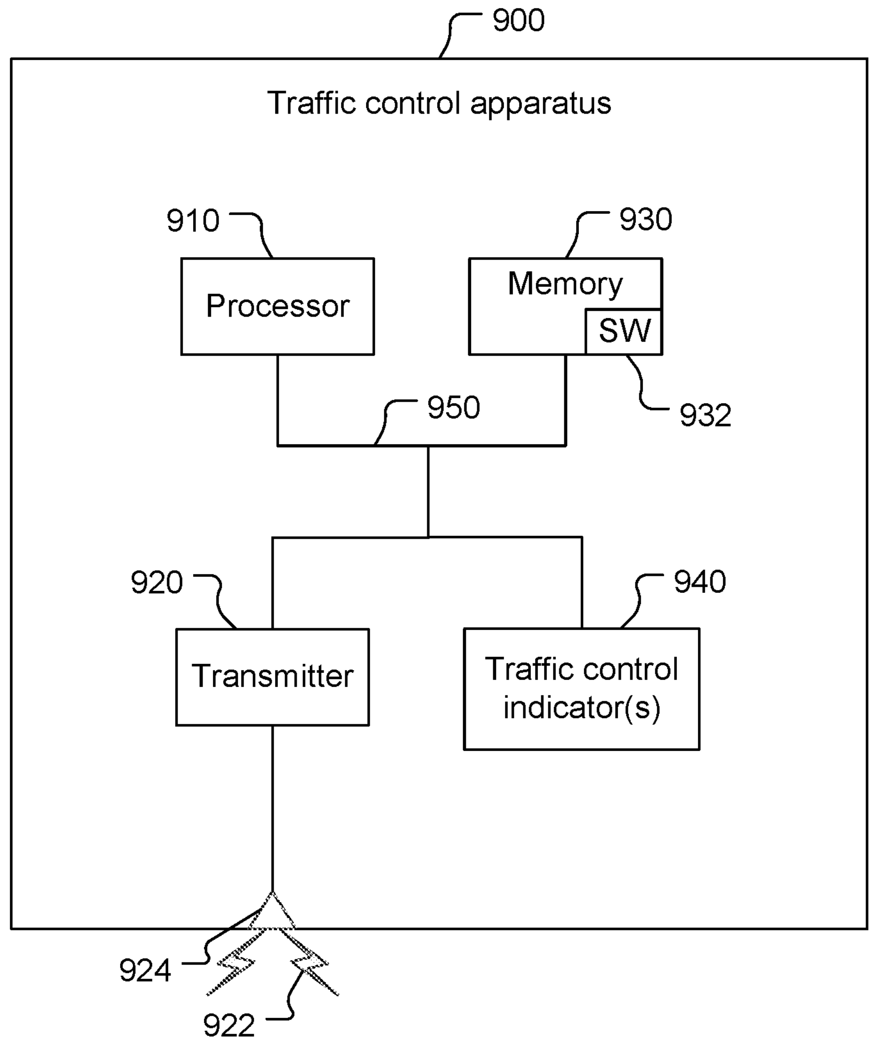
FIG. 9 is a simplified diagram of a traffic control apparatus.

Referring also to FIG. 9, a traffic control apparatus 900 includes a processor 910, a transmitter 920, a memory 930, and one or more traffic control indicators 940. The traffic control apparatus 900 may include the components shown in FIG. 9, and may include one or more other components. The processor 910, the transmitter 920, the memory 930, and the traffic control indicator(s) 940 may be communicatively coupled to each other by a bus 950 (which may be configured, e.g., for optical and/or electrical communication). One or more of the shown components may be omitted from the traffic control apparatus 900. The processor 910 may include one or more intelligent hardware devices, e.g., a central processing unit (CPU), a microcontroller, an application specific integrated circuit (ASIC), etc. The processor 910 may comprise multiple processors (e.g., including a general-purpose/application processor, a DSP, a modem processor, a video processor, etc.). The memory 930 is a non-transitory storage medium that may include random access memory (RAM)), flash memory, disc memory, and/or read-only memory (ROM), etc. The memory 930 may store software 932 which may be processor-readable, processor-executable software code containing instructions that are configured to, when executed, cause the processor 910 to perform various functions described herein. Alternatively, the software 932 may not be directly executable by the processor 910 but may be configured to cause the processor 910, e.g., when compiled and executed, to perform the functions. The transmitter 920 is configured to transmit wireless communication signals 922 via an antenna 924. The traffic control indicator(s) 940 may comprise one or more lights configured to emit the visual traffic control indication 732 and/or one or more speakers configured to emit the audible traffic control indications 734. The traffic control apparatus 900 may emit the traffic control indications 732, 734 via the traffic control indicator(s) 940 and may transmit control information (e.g., such as the control information 723, 724 (including the NFC)), e.g., wirelessly via the transmitter 920 and the antenna 924. Also or alternatively, the traffic control apparatus 900 transmit control information via the traffic control indicator(s) 940 as part of the traffic control indications 732, 734 (e.g., encoded in the traffic control indications 732, 734, e.g., using PWM).

At stage 740, position-related information for (e.g., location and/or heading of) the UE 600 is determined by the UE 600 and/or the server 400. The UE 600 may determine position-related information for the UE 600 at sub-stage 742 and/or the server 400 may determine position-related information for the UE 600 at sub-stage 746. The UE 600 and/or the server 400 may determine the position-related information in a variety of ways, examples of which are discussed further below. For the server 400 to determine the position-related information, the UE 600 may provide a message 744 comprising one or more sensor measurements (e.g., of the visual traffic control indications 732 and/or the audible traffic control indications 734) and/or one or more traffic control indications (e.g., as received by the UE 600 in the control information 723). The discussion below focuses on determination of position-related information by the UE 600 at sub-stage 742, but the discussion applies to the server 400 determining the position-related information at sub-stage 746. The server 400 may provide position-related information 748 determined at sub-stage 746 to the UE 600. The sub-stage 746, and transmission of the message 744 and the position-related information 748, may be omitted from the flow 700.

In an example technique for determining position-related information, the position-related information unit 660 may be configured to determine that a heading of the UE 600 changed proximate in time to a change in one or more traffic control indications. For example, the position-related information unit 660 may determine that the traffic control indication(s) 732, 734 indicate a change in traffic movement permission from denying permission to granting permission at a first time. As another example, the position-related information unit 660 may determine that a traffic control indication has changed, at the first time, based on one or more sensor measurements. For example, the position-related information unit 660 may determine that light emitted from the traffic light 521 and received by the camera 644 changes from red to green. As another example, the position-related information unit 660 may determine that light begins to be received from the lights 860 by the camera 644 and/or from one or more of the walk/don't-walk signs 871, 873. As another example, the position-related information unit 660 may determine that sound begins to be received from one or more of the crosswalk signalers 531, 533 by the microphone 645. The position-related information unit 660 may determine that the UE 600 changes heading at a second time. The change in heading of the UE 600 may be determined by the position-related information unit 660 based on one or more sensor measurements (e.g., from the accelerometer 641 and/or the magnetometer 643 and the gyroscope 642). The position-related information unit 660 may determine that the change in traffic movement permission (the first time) is within a threshold amount of time relative to the second time. Different thresholds may be used for movement of the UE 600 before the change in movement permission and for movement of the UE 600 after the change in movement position. For example, the threshold for movement before the change in permission may be shorter than the threshold for movement after the change in movement permission.

The position-related information unit 660 may determine a permitted direction of traffic movement corresponding to the traffic control indication(s). The position-related information unit 660 may determine one or more permitted directions of travel based on the source(s) of the traffic control indications indicating a change in movement permission. The permitted traffic movement may, for example, be in opposite directions, e.g., either an east direction or a west direction (as indicated by a legend 805 in FIG. 8) corresponding to the traffic lights 521, 522 changing from emitting red light to emitting green light, and/or the lights 860 of the crosswalk 861 (and/or lights of a crosswalk 862) changing from not emitting light to emitting light, and/or the walk/don't-walk signs 871, 873 (and/or walk/don't-walk signs of the crosswalk signalers 532, 534 corresponding to the crosswalk 862) changing from indicating "don't walk" to indicating "walk," and/or the crosswalk signalers 531, 533 providing one or more audible indications of crossing permission (e.g., chirps, cuckoo sounds, verbal instructions (e.g., "walk," "cross Elm Street"), etc.). One or more other visual indications may be used in addition to or instead of the traffic lights 521, 522, the lights 860, and the walk/don't-walk signs 871, 873. A verbal indication of permission to cross a particular street may be used in combination with map information to determine the permitted travel direction(s). For example, if a verbal instruction provides permission to cross a north-south street, then the position-related information unit 660 may determine that the permitted movement is either east or west. The north, east, south, and west directions are examples and other directions may correspond to permitted movement (e.g., X degrees relative to north). The position-related information unit 660 may obtain the permitted direction(s) of movement from the control information 723, 724, 725 and/or from one or more of the traffic control indications 732, 734. For example, the control information 723, 724, 725 may explicitly indicate possible direction(s) of travel corresponding to one or more traffic control devices (e.g., traffic lights, crosswalk signalers, etc.). The control information 723, 724, 725 may, for example, indicate which traffic control device changed permission to grant permission to move, and indicate in which direction(s) the movement is now permitted (e.g., crosswalk signalers 531, 533 changed to grant permission to move in an east direction or a west direction, or to move in a direction X° relative to north and Y° relative to north, e.g., with X and Y separated by 180°). As another example, the traffic control indications 732, 734 may indicate the permitted direction(s) of travel. For example, the sound signals 876, 878 may explicitly indicate the direction(s) of permitted movement (e.g., "walk west"). As another example, the traffic control indications 732, 734 may encode direction information, e.g., with one or more of the traffic control indications 732, 734 pulse width modulated (PWM) to convey the visual and/or audible information and also to convey information bits indicative of the permitted direction(s) of travel that the position-related information unit 660 may decode. As another example, the traffic control indications 732, 734 corresponding to different directions may have different characteristics. For example, one or more characteristics of sound signals corresponding to different directions may be different. For example, the sound signals 876, 878 may be repeated pulses of sound that may have different frequency, different periodicity, and/or different pulse duration than repeated pulses of sound of sound signals 877, 879 emitted by the crosswalk signalers 531, 534 (at different times than the sound signals 876, 878). The sound signals 876, 878 (for east-west travel) may, for example, be chirps while the sound signals 877, 879 (for north-south travel) may be "cuckoo" sounds.

The position-related information unit 660 may disambiguate between multiple possible directions of movement (e.g., opposite directions of the same crosswalk). For example, the position-related information unit 660 may be able to use a previous heading to determine the present heading. For example, if the UE 600 has been moving west, the position-related information unit 660 may conclude that the UE 600 is now moving west based on heading options of west and east. As another example, the position-related information unit 660 may be able to use an estimated location of the UE 600 at the time of the change in movement permission to disambiguate between multiple permitted travel headings. For example, if the location of the UE 600 is proximate an east end of an east-west crosswalk, such as the crosswalk 861, when east-west travel permission is granted, then movement of the UE 600 within a threshold time of the grant of travel permission may be determined to be west-bound movement. The location of the UE 600 may be obtained from a past location estimate, or from using a location of a crosswalk signaler 531-534 from which the UE 600 receives an NFC that includes the location of the crosswalk signaler 531-534. As another example, the position-related information unit 660 may be able to disambiguate the direction of travel based on magnitudes of received sound signals. For example, if the sound signals 876, 878 are transmitted with equal magnitudes and one or more different characteristics such that the sound signals 876, 878 may be differentiated, then the position-related information unit 660 may determine that the direction of travel is from the crosswalk signaler 531, 533 from which the sound signal 876, 878 with higher magnitude is initially received toward the other crosswalk signaler 531, 533. As another example, the position-related information unit 660 may be able to disambiguate the direction of travel based on colors of the lights 860. For example, if different rows of the lights 860 have different colors, then the position-related information unit 660 may be able to disambiguate the direction of travel based on which color of the lights 860 is on a port side relative to a direction of travel 880 (e.g., determined by one or more measurements from the gyroscope 642 and the accelerometer 641 and/or the gyroscope 642 and the magnetometer 643) and/or which color of the lights 860 is on a starboard side relative to the direction of travel 880.

The position-related information unit 660 may respond to the second time being within the threshold amount of time relative to the first time by determining the heading of the UE 600 using a direction associated with the permitted traffic movement. For example, the position-related information unit 660 may use the determined (and disambiguated as appropriate) permitted direction of travel as the heading of the UE 600. As another example, the position-related information unit 660 may use the determined (and disambiguated as appropriate) permitted direction of travel in combination with one or more other determined directions of travel (e.g., based on PRS and/or GNSS signals) to determine the heading of the UE 600. The combination may be, for example, a weighted average, with the determined permitted direction of travel based on the traffic control indication(s) being weighted more heavily than the direction(s) determined by other means.

In another example technique for determining position-related information, the position-related information unit 660 may be configured to determine a heading of the UE 600 based on, or independent of, the second time being within the threshold amount of time relative to the first time. For example, the microphone 645 may comprise an array of microphones such that the position-related information unit 660 may determine a direction of the crosswalk signaler(s) providing the sound signal(s) 876, 878 relative to the phone. The position-related information unit 660 may use information from the gyroscope 642 to determine the direction(s) of the sound source(s) relative to a reference coordinate system. The position-related information unit 660 may combine the direction(s) of the source(s) of the sound signal(s) 876, 878 with known location(s) of the source(s) and a direction of movement of the UE 600 indicated by the accelerometer 641 and the gyroscope 642 to determine the heading of the UE 600 relative to the reference coordinate system. As another example, the position-related information unit 660 may be configured to determine the location of the UE 600 based on the direction of the source(s) and the location(s) of the source(s) if the UE 600 can determine the range(s) from the UE 600 to the source(s) (e.g., based on known transmission time of the sound signal(s) 876, 878 and reception time of the sound signal(s) 876, 878 at the UE 600, and constraining the location of the UE 600 as appropriate, e.g., to a crosswalk or a street or a street lane).

In another example technique for determining position-related information, the position-related information unit 660 may be configured to determine a heading of the UE 600 based on one or more tone frequencies perceived by the UE 600. For example, the position-related information unit 660 may determine perceived frequencies of tones received by the microphone 645. A perceived frequency may differ from a transmitted frequency of a sound (e.g., a tone) due to Doppler shift of the frequency due to movement of the UE 600 relative to the source of the sound. For example, the position-related information unit 660 may determine a heading as being toward a sound source, e.g., the crosswalk signaler 531 based on the frequency of the sound being higher than a known transmission frequency of the sound. As another example, the position-related information unit 660 may determine that the heading of the UE 600 is toward the crosswalk signaler 531 and away from the crosswalk signaler 533 based on a perceived frequency of a tone received from the crosswalk signaler 531 being higher than a perceived frequency of a tone received from the crosswalk signaler 533 (e.g., if the transmission frequencies of the tones transmitted by the crosswalk signalers 531, 533 are the same). As another example, the position-related information unit 660 may determine that the heading of the UE 600 is toward the crosswalk signaler 531 and away from the crosswalk signaler 533 based on a perceived frequency of a tone received from the crosswalk signaler 531 being higher than the transmission frequency of the tone from the crosswalk signaler 531 and a perceived frequency of a tone received from the crosswalk signaler 533 being higher than the transmission frequency of the tone from the crosswalk signaler 533. Using the Doppler shift of the sound signal(s) from the sound source(s), the heading may be determined and/or disambiguated from among a set of possible headings.

In another example technique for determining position-related information, the position-related information unit 660 may be configured to determine a heading of the UE 600 based on sound magnitudes received over time and/or arrival timing of sound signals received over time. For example, the magnitude of the sound signal 876 may be received by the microphone 645 over time and the magnitude of the sound signal 876 over time determined by the processor 610. If the magnitude increases over time, then the processor 610 may determine the heading to be west, i.e., moving toward the crosswalk signaler 531 and within the crosswalk 861 or a lane 891. As another example, the relative reception time of the sound signals 876, 878 determined over time may indicate a heading of the UE 600. For example, if the sound signal 878 is received before the sound signal 876 and the time gap between reception times decreases over time, or if the sound signal 878 is received after the sound signal 876 and the time gap between reception times increases over time, then the processor 610 may determine the heading of the UE 600 to be west. As another example, if the sound signal 878 is received after the sound signal 876 and the time gap between reception times is substantially constant over time (e.g., within a threshold of being constant), then the processor 610 may determine the heading of the UE 600 to be west, with the UE 600 being disposed to the west of the crosswalk signaler 531.

In another example technique for determining position-related information, the position-related information unit 660 may be configured to determine location of the UE 600 based on the heading of the UE 600. For example, the position-related information unit 660 may use a previous location of the UE 600, the heading, a speed of the UE 600 at the heading, and a time that the UE 600 has been at that heading and speed to determine a present location of the UE 600 by dead reckoning. Thus, the position-related information unit 660 may calculate movement vector (of a magnitude and a direction of movement) based on the time, speed, and heading, and add the movement vector to the previous location to determine the present location of the UE 600. The heading determined using the traffic control indications 732, 734 may be more accurate than a heading determined using PRS and/or GNSS signals that are reflected within the environment 500, e.g., received by the UE 600 via multiple paths.

In another example technique for determining position-related information, the position-related information unit 660 may be configured to determine location of the UE 600 based on the location(s) of traffic control indicators and relative location of the UE 600 to the traffic control indicator(s). For example, the position-related information unit 660 may determine relative distances from multiple crosswalk signalers 531-534 based on signal magnitudes of received sound signals. For example, the position-related information unit 660 may determine magnitudes of the sound signals 876, 878 received by the microphone 645. The position-related information unit 660 may distinguish the sound signals 876, 878 based on knowledge of one or more different characteristics of the sound signals 876, 878 (e.g., frequency, pulse duration, pulse transmission time, etc.). The position-related information unit 660 may calculate a ratio of distances from the crosswalk signalers 531, 533 by calculating a ratio of the received magnitudes of the sound signals 876, 878 and using the ratio of the received magnitudes as the ratio of the distances. The received magnitudes may be adjusted based on knowledge of transmission magnitudes of the sound signals 876, 878, e.g., as provided in the control information 723-725 (at least the sound signal transmission magnitudes(s) of which may be transmitted after the sound signal(s) 876, 878 is(are) transmitted) and/or by the sound signals 876, 878 (e.g., by encoded information). The position-related information unit 660 may determine the position of the UE 600 based on the ratio of the distances to the crosswalk signalers 531, 533, the locations of the crosswalk signalers 531, 533, and by constraining the location. For example, the location may be constrained to be within the crosswalk 861 if the UE 600 is associated with a pedestrian or within a street or street lane such as a street 890 if the UE 600 is associated with a vehicle and the heading is unknown, or the lane 891 if the UE 600 is associated with a vehicle and a heading of west is known, or a lane 892 if the UE 600 is associated with a vehicle and a heading of west is known.

As another example of determining position based on received sound signals, the position-related information unit 660 may determine the distances to one or more of the crosswalk signalers based on timing of receipt of the sound signals 876, 878. For example, the position-related information unit 660 may calculate a difference in times of arrival of the sound signals 876, 878, and calculate a differential distance as the speed of sound times the calculated difference in times of arrival. The position-related information unit 660 may determine which of the crosswalk signalers 531, 533 is nearer to the UE 600 according to which of the sound signals 876, 878 the UE 600 received earlier (compensating, as appropriate, for any difference in time of transmission of the sound signals 876, 878, e.g., as indicated by the control information 723-725 (at least the sound signal transmission time(s) of which may be transmitted after the sound signal(s) 876, 878 is(are) transmitted) and/or by the sound signals 876, 878). The position-related information unit 660 may determine the location of the UE 600 as a location within the crosswalk 861 that is closer to the nearer crosswalk signaler 531, 533 than the other crosswalk signaler 531, 533 by the differential distance. The position-related information unit 660 may use map information of the crosswalk 861, e.g., received in the control information 723-725 or obtained through one or more other communications, to determine the location of the UE 600 or the motion (e.g., heading) of the UE 600 by determining the location of the UE 600 over time.

As another example of determining position based on received sound signals, the position-related information unit 660 may determine the distances to one or more of the crosswalk signalers based on timing of receipt of one or more of the sound signals 876, 878 and knowledge of transmission time(s) of the sound signal(s) 876, 878. For example, the position-related information unit 660 may calculate a range to each of the crosswalk signalers 531, 533 from which the UE 600 receives the respective sound signal 876, 878 and for which the UE 600 knows the corresponding transmission time (e.g., from the control information 723-725 (at least the sound signal transmission time(s) of which may be transmitted after the sound signal(s) 876, 878 is(are) transmitted) and/or from the sound signals 876, 878 (e.g., as encoded information)). The position-related information unit 660 may calculate the range(s) based on the time of travel and the speed of sound, and determine the location of the UE 600 based on the calculated range(s) and by constraining the location, e.g., to be within the crosswalk 861 (based on map information obtained by the UE 600), the street 890, the lane 891, or the lane 892.

In another example technique, the position-related information unit 660 may determine location of the UE 600 based on the location(s) of traffic control indicators and relative location of the UE 600 to the traffic control indicator(s). For example, knowing the size, shape, and location of the traffic light 521 and/or the walk/don't-walk sign 871 (or another source of the visual traffic control indications 732), the position-related information unit 660 may determine the location of the UE 600. The position-related information unit 660 may determine the relative location of the source of the visual traffic control indication 732, e.g., by capturing the visual traffic control indication 732 by the camera 644, and analyzing an image of the source, known shape and size of the source, and an orientation of the UE 600 as indicated by the gyroscope 642. The position-related information unit 660 may determine the location of the UE 600 based on the determined relative location of the source of the visual traffic control indication 732 and a location of the source of the visual traffic control indication 732 (e.g., obtained from the control information 723-725 and/or the visual traffic control indication 732, and/or obtained by one or more other communications). The position-related information unit 660 may limit the estimated location of the UE 600 to a crosswalk.

At stage 750, one or more of the sensor(s) 640 of the UE 600 may be calibrated based on headings determined using one or more traffic control indications and one or more sensor measurements. At sub-stage 752, the server 400 may determine and transmit one or more calibration parameters 754 to the UE 600 for calibrating one or more of the sensors 640 (e.g., determined based on a heading determined using the traffic control indication(s) compared with a heading determined based on one or more measurements of one or more of the sensors 640 (e.g., as discussed below with respect to the UE 600) with the sensor measurement(s) and/or the heading determined from the sensor measurement(s) being provided by the UE 600 to the server 400, e.g., in the message 744. At sub-stage 756, the sensor calibration unit 670 may use the position-related information and/or the calibration parameter(s) 754 to calibrate one or more of the sensors 640 of the UE 600. For example, the heading of the UE 600 calculated from the traffic control indication(s) 732, 734 may be compared against a heading determined from one or more sensor measurements of the magnetometer 643 and the gyroscope 642, and/or the accelerometer 641 and the gyroscope 642. A difference between the heading calculated from the traffic control indications and the heading calculated from the sensor measurement(s) may be used to adjust one or more calibration parameters of one or more of the sensors 640, e.g., such that the calculated headings are within a threshold proximity (e.g., a threshold number of degrees) of each other.

Figure 10:
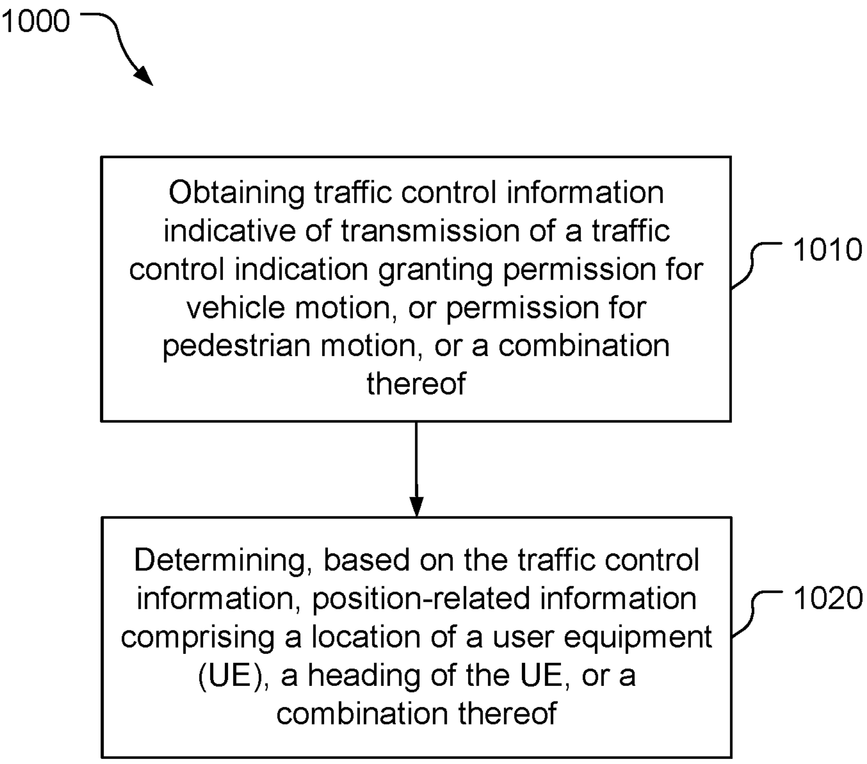
FIG. 10 is a block flow diagram of a positioning method.

Referring to FIG. 10, with further reference to FIGS. 1-9, a positioning method 1000 includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes obtaining traffic control information indicative of transmission of a traffic control indication granting permission for vehicle motion, or permission for pedestrian motion, or a combination thereof. For example, the UE 600 may obtain the traffic control information 723-725, e.g., through wireless communication and/or wired communication. The UE 600 may also or alternatively obtain traffic control information via the visual traffic control indications 732 and/or the audible traffic control indications 734, e.g., with the traffic control information encoded in traffic control indications. As another example, the server 400 may obtain the traffic control information 724 from the traffic control indication source(s) 702, e.g., directly or via the TRP 300. The traffic control information may be an indicator, for example, a traffic light color and/or an APS, and/or an indication of the indicator, e.g., an indication of a change in traffic light color or an indication of beginning of transmission of the APS. The traffic control indication may grant permission for vehicles and/or pedestrians to move relative to a direction, a path, a street, an intersection, a crosswalk, etc. The processor 610, possibly in combination with the memory 630, possibly in combination with a wireless receiver and antenna of the transceiver 620 and/or possibly in combination with one or more of the sensor(s) 640 (e.g., the camera 644 and/or the microphone 645) may comprise means for obtaining traffic control information. Also or alternatively, the processor 410, possibly in combination with the memory 411, possibly in combination with the wireless receiver 444 and the antenna 446 of the transceiver 415 and/or possibly in combination with the wired receiver 454 of the transceiver 415, may comprise means for obtaining traffic control information.

At stage 1020, the method 1000 includes determining, based on the traffic control information, position-related information comprising a location of a user equipment (UE), a heading of the UE, or a combination thereof. For example, the UE 600 and/or the server 400 may determine the heading of the UE 600 and/or the location of the UE 600, for example as discussed with respect to FIG. 7, using the traffic control information. Determining the position-related information without use of PRS or GNSS signals may enable heading and/or location determination that would otherwise not be possible, or with better accuracy than can be determined using PRS and/or GNSS without use of traffic control information. The processor 610, possibly in combination with the memory 630, may comprise means for determining position-related information based on the traffic control information. Also or alternatively, the processor 410, possibly in combination with the memory 411, may comprise means for determining position-related information based on the traffic control information.

Implementations of the method 1000 may include one or more of the following features. In an example implementation, determining the position-related information comprises determining the heading of the UE based on a change in motion of the UE at a first time that is within a threshold amount of time relative to a second time corresponding to receipt of the traffic control indication at the UE or transmission of the traffic control indication by a traffic control indication source. For example, the UE 600 and/or the server 400 may determine the position-related information in response to the UE 600 changing direction proximate in time to a change in permission of traffic movement corresponding to a time of transmission of the traffic control indication (e.g., emission of green light, emission of a "walk" sign, transmission of an accessible pedestrian signal, etc.) and/or receipt by the UE 600 of the traffic control indication. The UE 600 and/or the server 400 may use the change in motion and the direction(s) of permitted movement to determine the position-related information. The threshold amount of time may comprise one of multiple possible thresholds (e.g., one threshold for UE motion before change in traffic motion permission and a different threshold for UE motion after the change in traffic motion permission). The processor 610, possibly in combination with the memory 630, may comprise means for determining the heading of the UE based on the change in motion of the UE. Also or alternatively, the processor 410, possibly in combination with the memory 411, may comprise means for determining the heading of the UE based on the change in motion of the UE. In another example implementation, determining the position-related information comprises determining the heading of the UE based on a characteristic of a plurality of audible tones comprising the traffic control indication. For example, the UE 600 and/or the server 400 may determine the heading of the UE 600 based on the permitted direction(s) of motion associated with the traffic control indication that the UE 600 and/or the server 400 can determine based on one or more characteristics of the traffic control indication. For example, the UE 600 and/or the server 400 may know (e.g., have stored in the memory 630 and/or the memory 411) which frequency of audible signal corresponds to which permitted direction(s) of travel. The processor 610, possibly in combination with the memory 630, may comprise means for determining the heading of the UE based on the characteristic of the plurality of audible tones. Also or alternatively, the processor 410, possibly in combination with the memory 411, may comprise means for determining the heading of the UE based on the characteristic of the plurality of audible tones. In another example implementation, the characteristic of the plurality of audible tones is a frequency of each of the plurality of audible tones, or a duration of each of the plurality of audible tones, or a periodicity of the plurality of audible tones, or a combination thereof.

Also or alternatively, implementations of the method 1000 may include one or more of the following features. In an example implementation, determining the position-related information comprises determining the heading of the UE based on a first reception magnitude of a first tone received by the UE from a first source and a second reception magnitude of a second tone received by the UE from a second source; or determining the position-related information comprises determining the heading of the UE based on a first reception time of the first tone at the UE relative to a second reception time of the second tone at the UE; or determining the position-related information comprises determining the heading of the UE based on a first frequency of the first tone perceived by the UE and a second frequency of the second tone perceived by the UE. For example, the UE 600 and/or the server 400 may determine the heading of the UE 600 based on magnitudes of the sound signals 876, 878 relative to each other over time, e.g., with the heading being toward the source of the sound signal 876, 878 whose magnitude increases over time. As another example, the UE 600 and/or the server 400 may determine the heading of the UE 600 based on magnitudes of the sound signals 876, 878 relative to each other over time, e.g., with the heading being toward the source of the sound signal 876, 878 that arrives earlier over time. As another example, the 600 and/or the server 400 may determine the heading of the UE 600 based on perceived frequencies of tones of the sound signals 876, 878, e.g., with the heading being toward the source of the sound signal 876, 878 whose frequency is higher due to the Doppler effect. The UE 600 and/or the server 400 may combine two or more of these techniques to determine the heading, e.g., using one heading to verify another heading and/or combining (e.g., averaging) headings to determine a composite heading. The processor 610, possibly in combination with the memory 630, may comprise means for determining the heading of the UE based on the magnitudes of tones, and/or may comprise means for determining the heading of the UE based on the reception times of tones, and/or may comprise means for determining the heading of the UE based on the perceived frequency of tones. Also or alternatively, the processor 410, possibly in combination with the memory 411, may comprise means for determining the heading of the UE based on the magnitudes of tones, and/or may comprise means for determining the heading of the UE based on the reception times of tones, and/or may comprise means for determining the heading of the UE based on the perceived frequency of tones. In another example implementation, the method 1000 includes determining a direction of a source of a sound relative to the UE, and determining the position-related information comprises determining the position-related information based on the direction of the source of the sound relative to the UE and a location of the source of the sound. For example, the UE 600 and/or the server 400 may use measurements from an array of microphones to determine a direction of a sound source, e.g., the crosswalk signaler 531, relative to the UE 600 and to determine the location of the UE 600 and/or the heading of the UE 600 based on the location of the crosswalk signaler 531 and determined direction to the crosswalk signaler 531. For example, the location of the sound source in a reference coordinate system, the direction (in the reference coordinate system) of the sound source relative to the UE 600, and a direction of movement (in the reference coordinate system) of the UE 600 (e.g., based on one or more measurements of the accelerometer 641) may be used to determine the heading of the UE 600 relative to the reference coordinate system. The processor 610, possibly in combination with the memory 630, in combination with the microphone 645 may comprise means for determining the direction of the source of sound, and the processor 610, possibly in combination with the memory 630, may comprise means for determining the position-related information based on the direction of the source of sound and the location of the source of the sound. Also or alternatively, the processor 410, possibly in combination with the memory 411, in combination with the transceiver 415 (e.g., the wired receiver 454 and/or the wireless receiver 444 and the antenna 446) may comprise means for determining the direction of the source of sound (e.g., with information regarding the direction of the source of the sound (e.g., microphone measurements) transmitted to the server 400 from the UE 600), and the processor 410, possibly in combination with the memory 411, may comprise means for determining the position-related information based on the direction of the source of sound and the location of the source of the sound.

Also or alternatively, implementations of the method 1000 may include one or more of the following features. In an example implementation, the method 1000 includes determining the location of the UE based on a traffic control indication source location indicated in a near-field communication received by the UE. For example, the UE 600 and/or the server 400 may determine the location of the UE 600 as the location of source of the traffic control indication (e.g., a crosswalk signaler, a traffic light pole, etc.) as indicated in an NFC transmitted by the source of the traffic control indication and received by the UE 600. The processor 610, possibly in combination with the memory 630, in combination with the transceiver 620 (e.g., the wireless receiver 244 and the antenna 246) may comprise means for determining the location of the UE based on the traffic control indication source location indicated in the NFC. Also or alternatively, the processor 410, possibly in combination with the memory 411, in combination with the transceiver 415 (e.g., the wired receiver 454 and/or the wireless receiver 444 and the antenna 446) may comprise means for determining the location of the UE based on the traffic control indication source location indicated in the NFC (e.g., with information regarding the NFC received by the UE 600 transmitted to the server 400 from the UE 600). In another example implementation, the position-related information is a first heading of the UE, the positioning method includes determining a second heading of the UE based on measurements from a plurality of sensors of the UE, and the positioning method includes calibrating one or more of the plurality of sensors based on a difference between the first heading of the UE and the second heading of the UE. For example, the UE 600 and/or the server 400 determines a heading of the UE 600 based on measurements from the magnetometer 643 and the gyroscope 642, and/or the accelerometer 641 and the gyroscope 642. The UE 600 and/or the server 400 may determine one or more calibration parameters (e.g., adjustments to one or more sensor measurements) in order to calibrate one or more of the sensors 640. The processor 610, possibly in combination with the memory 630, in combination with one or more of the sensors 640 may comprise means for determining the second heading, and the processor 610, possibly in combination with the memory 630, may comprise means for calibrating one or more sensors. Also or alternatively, the processor 410, possibly in combination with the memory 411, in combination with the transceiver 415 (e.g., the wired receiver 454 and/or the wireless receiver 444 and the antenna 446) may comprise means for determining the second heading (e.g., with information regarding the second heading (e.g., one or more sensor measurements) transmitted to the server 400 from the UE 600), and the processor 410, possibly in combination with the memory 411, in combination with the transceiver 415 (e.g., the wired transmitter 452 and/or the wireless transmitter 442 and the antenna 446) may comprise means for calibrating one or more of sensors. In another example implementation, determining the position-related information comprises determining the heading of the UE based on speech received by the UE and based on map information. For example, the UE 600 and/or the server 400 may recognize speech in one or more of the sound signals 876, 878, e.g., a street name, and use the street name and map information to determine the heading of the UE 600. The processor 610, possibly in combination with the memory 630, in combination with the microphone 645 may comprise means for determining the heading of the UE based on speech. Also or alternatively, the processor 410, possibly in combination with the memory 411, in combination with the transceiver 415 (e.g., the wired receiver 454 and/or the wireless receiver 444 and the antenna 446) may comprise means for determining the heading of the UE based on speech (e.g., with information regarding the speech (e.g., microphone measurements) transmitted to the server 400 from the UE 600).

Figure 11:
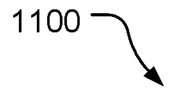
FIG. 11 is a block flow diagram of a traffic control method.
Figure 11:
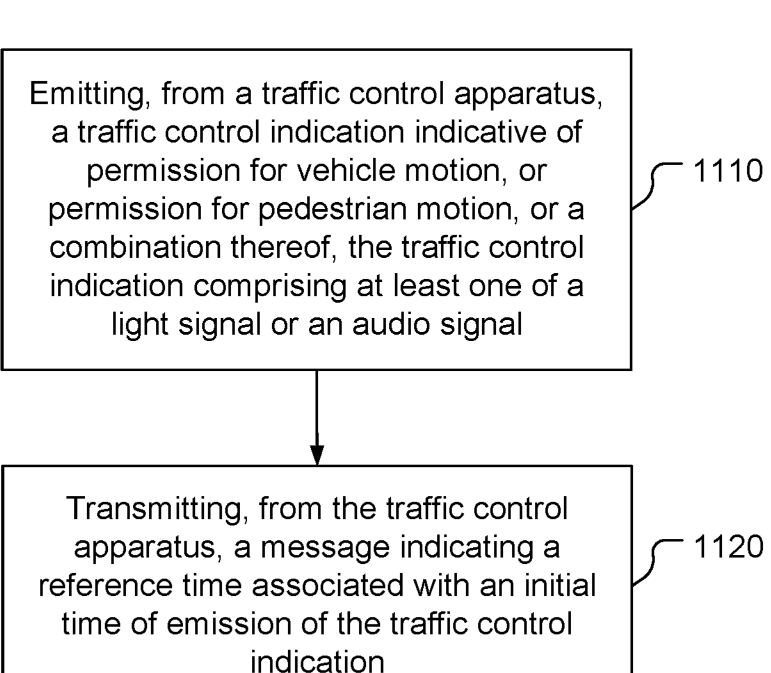

Referring to FIG. 11, with further reference to FIGS. 1-9, a traffic control method 1100 includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes emitting, from a traffic control apparatus, a traffic control indication indicative of permission for vehicle motion, or permission for pedestrian motion, or a combination thereof, the traffic control indication comprising at least one of a light signal or an audio signal. For example, the traffic control apparatus 900 transmits one or more of the visual traffic control indications 732 and/or one or more of the audible traffic control indications 734 to indicate permission (e.g., a change from permission denied to permission granted) for vehicle and/or pedestrian motion. The traffic control indicator(s) 940, possibly in combination with the processor 910 and possibly in combination with the memory 930, may comprise means for emitting the traffic control indication.

At stage 1120, the method 1100 includes transmitting, from the traffic control apparatus, a message indicating a reference time associated with an initial time of emission of the traffic control indication. For example, the traffic control apparatus 900 transmits the control information 723, 724 to the UE 600 indicating a time of emission of the traffic control indication and/or a time of instruction from the processor 910 to the traffic control indicator(s) 940 to emit the traffic control indication. The processor 910, in combination with the memory 930, in combination with the transmitter 920 (e.g., a wireless transmitter and the antenna 924) may comprise means for transmitting the message indicating the reference time associated with an initial time of emission of the traffic control indication.

Implementations of the method 1100 may include one or more of the following features. In an example implementation, transmitting the message comprises transmitting one or more characteristics of the traffic control indication. For example, the control information 723, 724 may include one or more characteristics of the traffic control indication (e.g., a source location of the traffic control indication) that can be used to identify the traffic control indication and/or a source of the traffic control indication, e.g., for use in determining heading and/or location of the UE 600. In another example implementation, the traffic control indication comprises a plurality of audible tones, and the one or more characteristics of the traffic control indication comprises a frequency of the plurality of audible tones, or a duration of each of the plurality of audible tones, or a periodicity of the plurality of audible tones, or any combination thereof. For example, the message may indicate two or more of a sound frequency of tones, a periodicity of non-continuous tones (e.g., chirps or cuckoo sounds), and/or a duration of the non-continuous tones.

Also or alternatively, implementations of the method 1100 may include one or more of the following features. In an example implementation, emitting the traffic control indication comprises emitting the traffic control indication to indicate one or more characteristics of the traffic control indication. For example, the visual traffic control indication 732 and/or the audible traffic control indication 734 may be encoded with one or more indications of one or more characteristics (e.g., frequency, pulse duration, pulse periodicity, source location) of the traffic control indication. In another example implementation, the method 1100 includes transmitting, from the traffic-control apparatus, a near-field communication indicating a location of the traffic control apparatus. For example, the traffic control apparatus 900 transmits an NFC indicating a location of the traffic control apparatus 900 (e.g., a light pole, a crosswalk signaler, etc.). The processor 910, in combination with the memory 930, in combination with the transmitter 920 (e.g., a wireless transmitter and the antenna 924) may comprise means for transmitting the near-field communication.

Implementation Examples

Implementation examples are provided in the following numbered clauses.

1. An apparatus comprising:

means for obtaining traffic control information indicative of transmission of a traffic control indication granting permission for vehicle motion, or permission for pedestrian motion, or a combination thereof; and means for determining, based on the traffic control information, position-related information comprising a location of a user equipment (UE), a heading of the UE, or a combination thereof.

2. The apparatus of clause 1, wherein the means for determining the position-related information comprise means for determining the heading of the UE based on a change in motion of the UE at a first time that is within a threshold amount of time relative to a second time corresponding to receipt of the traffic control indication at the UE or transmission of the traffic control indication by a traffic control indication source.

3. The apparatus of clause 1, wherein the means for determining the position-related information comprise means for determining the heading of the UE based on a characteristic of a plurality of audible tones comprising the traffic control indication.

4. The apparatus of clause 3, wherein the characteristic of the plurality of audible tones is a frequency of each of the plurality of audible tones, or a duration of each of the plurality of audible tones, or a periodicity of the plurality of audible tones, or a combination thereof.

5. The apparatus of clause 1, wherein:

the means for determining the position-related information comprise means for determining the heading of the UE based on a first reception magnitude of a first tone received by the UE from a first source and a second reception magnitude of a second tone received by the UE from a second source; or the means for determining the position-related information comprise means for determining the heading of the UE based on a first reception time of the first tone at the UE relative to a second reception time of the second tone at the UE; or the means for determining the position-related information comprise means for determining the heading of the UE based on a first frequency of the first tone perceived by the UE and a second frequency of the second tone perceived by the UE; or any combination thereof.

6. The apparatus of clause 1, further comprising means for determining a direction of a source of a sound relative to the UE, wherein the means for determining the position-related information comprise means for determining the position-related information based on the direction of the source of the sound relative to the UE and a location of the source of the sound.

7. The apparatus of clause 1, further comprising means for determining the location of the UE based on a traffic control indication source location indicated in a near-field communication received by the UE.

8. The apparatus of clause 1, wherein:

the position-related information is a first heading of the UE;

the apparatus further comprises means for determining a second heading of the UE based on measurements from a plurality of sensors of the UE; and the apparatus further comprises means for calibrating one or more of the plurality of sensors based on a difference between the first heading of the UE and the second heading of the UE.

9. The apparatus of clause 1, wherein the means for determining the position-related information comprise means for determining the heading of the UE based on speech received by the UE and based on map information.

10. A non-transitory, processor-readable storage medium comprising processor-readable instructions configured to cause a processor of an apparatus to:

obtain traffic control information indicative of transmission of a traffic control indication granting permission for vehicle motion, or permission for pedestrian motion, or a combination thereof; and determine, based on the traffic control information, position-related information comprising a location of a user equipment (UE), a heading of the UE, or a combination thereof.

11. The storage medium of clause 10, wherein the processor-readable instructions to cause the processor to determine the position-related information comprise processor-readable instructions to cause the processor to determine the heading of the UE based on a change in motion of the UE at a first time that is within a threshold amount of time relative to a second time corresponding to receipt of the traffic control indication at the UE or transmission of the traffic control indication by a traffic control indication source.

12. The storage medium of clause 10, wherein the processor-readable instructions to cause the processor to determine the position-related information comprise processor-readable instructions to cause the processor to determine the heading of the UE based on a characteristic of a plurality of audible tones comprising the traffic control indication.

13. The storage medium of clause 12, wherein the characteristic of the plurality of audible tones is a frequency of each of the plurality of audible tones, or a duration of each of the plurality of audible tones, or a periodicity of the plurality of audible tones, or a combination thereof.

14. The storage medium of clause 10, wherein:

the processor-readable instructions to cause the processor to determine the position-related information comprise processor-readable instructions to cause the processor to determine the heading of the UE based on a first reception magnitude of a first tone received by the UE from a first source and a second reception magnitude of a second tone received by the UE from a second source; or the processor-readable instructions to cause the processor to determine the position-related information comprise processor-readable instructions to cause the processor to determine the heading of the UE based on a first reception time of the first tone at the UE relative to a second reception time of the second tone at the UE; or the processor-readable instructions to cause the processor to determine the position-related information comprise processor-readable instructions to cause the processor to determine the heading of the UE based on a first frequency of the first tone perceived by the UE and a second frequency of the second tone perceived by the UE; or any combination thereof.

15. The storage medium of clause 10, further comprising processor-readable instructions to cause the processor to determine a direction of a source of a sound relative to the UE, the processor-readable instructions to cause the processor to determine the position-related information comprise processor-readable instructions to cause the processor to determine the position-related information based on the direction of the source of the sound relative to the UE and a location of the source of the sound.

16. The storage medium of clause 10, further comprising processor-readable instructions to cause the processor to determine the location of the UE based on a traffic control indication source location indicated in a near-field communication received by the UE.

17. The storage medium of clause 10, wherein:

the position-related information is a first heading of the UE;

the storage medium further comprises processor-readable instructions to cause the processor to determine a second heading of the UE based on measurements from a plurality of sensors of the UE; and the storage medium further comprises processor-readable instructions to cause the processor to calibrate one or more of the plurality of sensors based on a difference between the first heading of the UE and the second heading of the UE.

18. The storage medium of clause 10, wherein the processor-readable instructions to cause the processor to determine the position-related information comprise processor-readable instructions to cause the processor to determine the heading of the UE based on speech received by the UE and based on map information.

19. A traffic control apparatus comprising:

means for emitting a traffic control indication indicative of permission for vehicle motion, or permission for pedestrian motion, or a combination thereof, the traffic control indication comprising at least one of a light signal or an audio signal; and means for transmitting a message indicating a reference time associated with an initial time of emission of the traffic control indication.

20. The traffic control method of clause 19, wherein the means for transmitting the message comprise means for transmitting one or more characteristics of the traffic control indication.

21. The traffic control method of clause 20, wherein the traffic control indication comprises a plurality of audible tones, and wherein the one or more characteristics of the traffic control indication comprises a frequency of the plurality of audible tones, or a duration of each of the plurality of audible tones, or a periodicity of the plurality of audible tones, or any combination thereof.

22. The traffic control method of clause 19, wherein the means for emitting the traffic control indication comprise means for emitting the traffic control indication to indicate one or more characteristics of the traffic control indication.

23. The traffic control method of clause 19, further comprising means for transmitting a near-field communication indicating a location of the traffic control apparatus.

24. A non-transitory, processor-readable storage medium comprising processor-readable instructions configured to cause a processor of an apparatus to:

emit a traffic control indication indicative of permission for vehicle motion, or permission for pedestrian motion, or a combination thereof, the traffic control indication comprising at least one of a light signal or an audio signal; and transmit a message indicating a reference time associated with an initial time of emission of the traffic control indication.

25. The traffic control method of clause 24, wherein the processor-readable instructions configured to cause the processor to transmit the message comprise processor-readable instructions configured to cause the processor to transmit one or more characteristics of the traffic control indication.

26. The traffic control method of clause 25, wherein the traffic control indication comprises a plurality of audible tones, and wherein the one or more characteristics of the traffic control indication comprises a frequency of the plurality of audible tones, or a duration of each of the plurality of audible tones, or a periodicity of the plurality of audible tones, or any combination thereof.

27. The traffic control method of clause 24, wherein the processor-readable instructions configured to cause the processor to emit the traffic control indication comprise processor-readable instructions configured to cause the processor to emit the traffic control indication to indicate one or more characteristics of the traffic control indication.

28. The traffic control method of clause 24, further comprising processor-readable instructions configured to cause the processor to transmit a near-field communication indicating a location of the traffic control apparatus.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:

an input;

a memory; and a processor communicatively coupled to the input and the memory and configured to:

obtain, via the input, traffic control information from one or more sensors of a user equipment (UE), the UE being a mobile device, one or more sensors comprising at least one camera, at least one microphone, or a combination thereof, and the traffic control information being indicative of transmission of a traffic control indication granting permission for vehicle motion, or permission for pedestrian motion, or a combination thereof; and determine position-related information based on at least one image, at least one sound, or a combination thereof of the traffic control information, the position-related information comprising a location of the UE, a heading of the UE, or a combination thereof.

2. The apparatus of claim 1, wherein the processor is configured to determine the heading of the UE based on a motion indication indicating a change in motion of the UE at a first time that is within a threshold amount of time relative to a second time corresponding to receipt of the traffic control indication at the UE or transmission of the traffic control indication by a traffic control indication source.

3. The apparatus of claim 1, wherein the processor is configured to determine the heading of the UE based on a characteristic of a plurality of audible tones comprising the traffic control indication.

4. The apparatus of claim 3, wherein the characteristic of the plurality of audible tones is a frequency of each of the plurality of audible tones, or a duration of each of the plurality of audible tones, or a periodicity of the plurality of audible tones, or a combination thereof.

5. The apparatus of claim 1, wherein:

the processor is configured to determine the position-related information based on a first reception magnitude of a first tone received by the UE from a first source and a second reception magnitude of a second tone received by the UE from a second source; or the processor is configured to determine the position-related information based on a first reception time of the first tone at the UE relative to a second reception time of the second tone at the UE; or the processor is configured to determine the heading of the UE based on a first frequency of the first tone perceived by the UE and a second frequency of the second tone perceived by the UE; or any combination thereof.

6. The apparatus of claim 1, wherein the processor is further configured to determine a direction of a source of a sound relative to the UE, and wherein the processor is configured to determine the position-related information based on the direction of the source of the sound relative to the UE and a location of the source of the sound.

7. The apparatus of claim 1, wherein the processor is further configured to determine the location of the UE based on a traffic control indication source location indicated in a near-field communication received by the UE.

8. The apparatus of claim 1, wherein:

the position-related information is a first heading of the UE;

the apparatus is the UE;

the input comprises the one or more sensors of the UE, that comprise a plurality of UE sensors;

the processor is communicatively coupled to the plurality of UE sensors and further configured to determine a second heading of the UE based on measurements from the plurality of UE sensors; and the processor is further configured to calibrate one or more of the plurality of UE sensors based on a difference between the first heading of the UE and the second heading of the UE.

9. The apparatus of claim 1, wherein the position-related information is the heading of the UE, and wherein the processor is configured to determine the heading of the UE based on speech received by the UE and based on map information.

10. A positioning method comprising:

obtaining traffic control information from one or more sensors of a user equipment (UE), the UE being a mobile device, one or more sensors comprising at least one camera, at least one microphone, or a combination thereof, and the traffic control information being indicative of transmission of a traffic control indication granting permission for vehicle motion, or permission for pedestrian motion, or a combination thereof; and determining position-related information based on at least one image, at least one sound, or a combination thereof of the traffic control information, the position-related information comprising a location of the UE, a heading of the UE, or a combination thereof.

11. The positioning method of claim 10, wherein determining the position-related information comprises determining the heading of the UE based on a change in motion of the UE at a first time that is within a threshold amount of time relative to a second time corresponding to receipt of the traffic control indication at the UE or transmission of the traffic control indication by a traffic control indication source.

12. The positioning method of claim 10, wherein determining the position-related information comprises determining the heading of the UE based on a characteristic of a plurality of audible tones comprising the traffic control indication.

13. The positioning method of claim 12, wherein the characteristic of the plurality of audible tones is a frequency of each of the plurality of audible tones, or a duration of each of the plurality of audible tones, or a periodicity of the plurality of audible tones, or a combination thereof.

14. The positioning method of claim 10, wherein:

determining the position-related information comprises determining the heading of the UE based on a first reception magnitude of a first tone received by the UE from a first source and a second reception magnitude of a second tone received by the UE from a second source; or determining the position-related information comprises determining the heading of the UE based on a first reception time of the first tone at the UE relative to a second reception time of the second tone at the UE; or determining the position-related information comprises determining the heading of the UE based on a first frequency of the first tone perceived by the UE and a second frequency of the second tone perceived by the UE; or any combination thereof.

15. The positioning method of claim 10, further comprising determining a direction of a source of a sound relative to the UE, wherein determining the position-related information comprises determining the position-related information based on the direction of the source of the sound relative to the UE and a location of the source of the sound.

16. The positioning method of claim 10, further comprising determining the location of the UE based on a traffic control indication source location indicated in a near-field communication received by the UE.

17. The positioning method of claim 10, wherein:

the position-related information is a first heading of the UE;

the one or more sensors of the UE comprise a plurality of UE sensors;

the positioning method further comprises determining a second heading of the UE based on measurements from the plurality of UE sensors; and the positioning method further comprises calibrating one or more of the plurality of sensors based on a difference between the first heading of the UE and the second heading of the UE.

18. The positioning method of claim 10, wherein determining the position-related information comprises determining the heading of the UE based on speech received by the UE and based on map information.

* * * * *